United States Patent [19]

Lenz

[11] Patent Number: 4,823,772

[45] Date of Patent: Apr. 25, 1989

[54] APPARATUS AND METHOD FOR EXTRACTING FOCUSED SOLAR RADIANT ENERGY

[76] Inventor: Erwin Lenz, 180 Cabrini Blvd., New York, N.Y. 10033

[21] Appl. No.: 104,465

[22] Filed: Oct. 5, 1987

[51] Int. Cl.$^4$ .................................................. F24J 2/24
[52] U.S. Cl. .................................... 126/448; 126/424; 126/438; 126/440; 126/442
[58] Field of Search .......................... 60/641.8, 641.15; 126/419, 422, 424, 425, 438, 440, 442, 448

[56] References Cited

U.S. PATENT DOCUMENTS

| | | |
|---|---|---|
| 820,127 | 5/1906 | Pope . |
| 1,683,266 | 9/1928 | Shipman . |
| 2,133,649 | 10/1938 | Abbott .............................. 126/424 |
| 2,920,710 | 1/1960 | Howard . |
| 3,675,023 | 7/1972 | Kunke et al. . |
| 3,860,055 | 1/1975 | Wild . |
| 3,999,389 | 12/1976 | Bryce . |
| 4,011,858 | 3/1977 | Hurkett . |
| 4,038,971 | 8/1977 | Bezborodko . |
| 4,055,948 | 11/1977 | Kraus et al. ........................ 60/641.8 |
| 4,068,653 | 1/1978 | Bourdon et al. . |
| 4,109,638 | 8/1978 | Matlock et al. ..................... 126/425 |
| 4,148,300 | 4/1979 | Kaufman, Sr. . |
| 4,153,039 | 5/1979 | Carroll . |
| 4,168,696 | 9/1979 | Kelly . |
| 4,257,401 | 3/1981 | Daniels . |
| 4,275,710 | 6/1981 | Stevenson . |
| 4,376,372 | 3/1983 | English, Jr. ...................... 60/641.15 |

*Primary Examiner*—Stephen F. Husar
*Attorney, Agent, or Firm*—Barry G. Magidoff

[57] ABSTRACT

There is provided solar heat collecting apparatus which comprises a solar collector panel rotatably supported about a horizontal and a vertical axis and drive means for rotating the panel simultaneously about the two axes. The collector panel comprises a battery of individual collector units wherein each collector unit comprises an elongated trough member, a concave reflective surface forming at least a portion of the interior surface of the trough and a fluid carrying pipe extending longitudinally within the trough member, the longitudinal axis of the pipe being substantially coincident with the focal line of the concave reflective surface. The pipe can be formed of a material that is substantially transparent to solar radiation. In addition, there can be a linear focusing lens, substantially covering and extending over the concave reflective surface. The focal line for the linear lens should be substantially coincident also with the longitudinal axis of the fluid carrying pipe.

17 Claims, 11 Drawing Sheets

APPARATUS AND METHOD FOR EXTRACTING FOCUSED SOLAR RADIANT ENERGY

This invention relates generally to an apparatus and method for concentrating solar radiant energy and more particularly relates to apparatus for efficiently concentrating sunlight and converting same to heat energy.

BACKGROUND OF THE INVENTION

At a time of increasing concern over pollution of the atmosphere, the land and the oceans, it is particularly important to develop means to provide for the energy needs of civilization without further creating pollution. This requires a system where energy is collected without by-products requiring disposal, such as carbon dioxide and carbon monoxide and other noxious gases as well as the ash from the burning of hydrocarbon fuels, whether gases, liquid petroleum or solid coal, or the disposal of radioactive wastes from nuclear reactor systems.

Amongst the many sources of pollution-free energy, hydroelectric power has perhaps been the most successful to date. However, even hydroelectric power requires a permanent change in the land and a loss of valuable landscape, as is shown by the controversies which have erupted as new power dam sites have been proposed or placed under construction. Perhaps the oldest dream, however, has been to harness the practically limitless and free energy available from sunlight, or solar radiation. This dream has been exemplified by many systems and methods for collecting, focusing and concentrating, and converting the solar radiation to a usable form of energy, preferably ultimately to generate electricity.

Solar energy collection devices have ranged from the relatively simple flat panels which are situated on the roofs of dwellings and other houses and generally provide within the flat panel numerous pipes for circulating water, which are than heated to provide hot water and heat to the house in the evening hours. In the more sophisticated designs, there is also a heat reservoir, generally located underground, to store the heat during those periods when sunlight is weak or at night.

Other more sophisticated devices have been designed and constructed for the generation of electricity by converting the sunlight first to heat and then applying the heat to boil a liquid to drive a turbine or other generator system. Finally, recently developed systems provide for the direct conversion of sunlight to electricity using photo-electric cells. Such units generally include means for greatly concentrating and focusing the sun's radiation as well as mechanical means for tracking the sun so as to maintain the focusing mechanism in the most desirable, i.e., perpendicular, position relative to the direction of the sun's rays.

Such focusing or concentrating collector means are described for example in U.S. Pat. Nos. 4,257,401; 4,168,696; 4,148,300; 4,038,971 and 4,011,858. Mechanical devices for tracking the sun and supporting the focusing collector are disclosed for example in U.S. Pat. Nos. 4,153,039; 4,068,653; 3,999,389 and 4,275,710, and 820,127.

These various systems provide reflecting and/or refracting focusing mirrors and lenses, such as parabolic reflectors and convex lens or fresnel-type lenses to focus and concentrate a relatively large surface area of incident radiation upon a small surface area which is to be heated, and mechanical means for tracking the sun.

SUMMARY OF THE INVENTION

It is an object of the present invention to provide improved apparatus and methods for converting solar radiation to electricity. It is a further object of this invention to provide relatively simple electromechanical means for tracking the sun daily and seasonally. It is yet another object of this invention to provide means which are suitable to collect and concentrate sunlight so as to obtain useful amounts of energy conversion during periods of low sunlight as well as during periods of maximum sunlight.

It has long been recognized that it is important to maintain the solar collecting panel substantially perpendicular, or normal, to the incoming sun rays during substantially the entire daylight period. The prior art has utilized several complicated systems for achieving this end. It has now been perceived that a combination of simple, synchronous, or clockwork mechanisms acting simultaneously about two mutually perpendicular axes, provides a resultant movement which precisely tracks the sun and maintains the solar panel in the desired position throughout the daylight hours, of every season. It is only necessary to provide control means to initially set the relative angles about each axis for the beginning of each day of the year and to commence the clock-work movement at sunrise, or at any other predetermined time during the morning hours, for which the solar panel is set perpendicularly to the incoming rays of the sun. Similarly, the control means should stop the clockwork movement at sunset, or at some predetermined time before sunset, and return the solar panel, rotating in a reverse direction about the two axes to the starting position for the following day. It has been found that such control can be readily accomplished utilizing a simple computer wherein the position of the sun at a predetermined time in the morning of each day of the year, at the particular latitude at which the solar collection device is located, has been programmed into the system, together with the time of day at which the movement should start and stop.

Thus, in accordance with this invention solar collector means are provided which comprise solar panel means, horizontal support means rotatively supporting the panel about a horizontal axis; vertical support means rotatively supporting the panel about a vertical axis; motor means for rotating, or swiveling, the panel substantially continuously about the horizontal axis, through a total angle of not greater than about 180°, preferably beginning at the vertical position facing the rising sun directly horizontally through the fully horizontal position (facing directly up), and to a position downwardly from the horizontal on the opposite side, at an angle of at least about 90°; and for simultaneously rotating the panel substantially continuously about the vertical axis through a total angle of less than 270°; and control means for initially setting the angular positions of the solar panels at sunrise each day relative to both axes, and for starting the motor means at a predetermined time of each day. Preferably, the control means also stops the rotating movement about the axes at the end of the day and return the solar panel to a suitable starting position for the following morning.

Preferably, the solar panel is directly rotatably supported on the horizontal support means, which structure in turn is rotatably supported on the vertical support means. Also, preferably, two separate electric motor driven mechanisms are used, one to drive the support means about each of the horizontal and vertical axes. The electric motors are to be each operated at a constant predetermined speed which is transmitted through suitable gearing to the rotating mechanisms.

The solar panel can be returned to its morning, or sunrise, position, after sunset, either by reversing the electric motor drive or by using a separate reverse drive mechanism, including, for example, a spring-operated device.

This simple mechanical drive system is capable of maintaining one or more solar collector panels normal to the suns rays during the almost 180 degree daily angle of traverse from dawn to sunset, and to take into account the seasonal change in the angle of the sun from the horizon in a north-south direction, approximately 47° between the winter and summer solstices in the temperate zones.

The biaxially rotatable solar collector panel is secured in a frame rotatably secured about the two mutually perpendicular axes. Each solar collector panel comprises a plurality of radiation concentration, or focusing, solar collector units, mounted on the panel frames. Each radiation concentration unit comprises one or more fluid-carrying pipes longitudinally extending along the unit and located at the focal line of a longitudinally extending concave reflector. The plurality of fluid-carrying pipes on each solar panel can be connected in series or in parallel, or combinations thereof.

Each tube is located within a trough-like reflector unit, the cross-section of which provides a concave reflector, for example, a parabolic reflector. The upper side of the trough can be uncovered and open to the sun. Alternatively, the tube can be fully enclosed within the reflector trough, the upper side of which is closed off and covered by an transparent elongated lens covering the trough and extending across between the two sides and along the length of the trough. The internal sides of the trough can be non-reflective surfaces. The lens can be of the convex lens type, or it can be, e.g., a fresnel lens, for focusing incident sunlight onto the tube, which is located along the focal line of the reflecting surfaces and of the lens.

It has been found preferable to have the walls of the fluid-carrying tubes be transparent, and that the focal line of each of the concave reflector and of the refractive lens are substantially coincident with each other and with the longitudinal axis of the fluid-carrying tube. In this manner, the fluid itself directly absorbs the heat.

Preferably, the reflector trough is also insulated so as to reduce heat loss, especially under bright conditions when the temperature of the fluid in the tube can reach substantially above the normal boiling point of water.

It is preferred that the primary fluid carried within the tube in the solar panel be of a higher boiling point liquid, preferably having a boiling point more than twice that of water, and is in an enclosed, recirculating system. In this system, a preferably much lower boiling point secondary fluid is in heat exchanging contact with the primary fluid in the tube, which secondary fluid is the operating fluid for driving means for, e.g., a turbine, an electric generator.

It is preferred that the solar panels are directly rotatably swiveled about the horizontal axis, and the panels and horizontal axis support structure are, in turn, rotatably supported about the vertical axis.

The fluid-carrying system must provide means for accommodating the swiveling of the tubes about the horizontal and vertical axes and for this purpose the tubing is provided with suitable joints; in accordance with this invention this is a special swivel joint which permits relative rotation of the tubes on the solar panel without leakage of fluid even under the increased pressure created by elevated temperatures. The stationary final inlet and outlet tubing from the panel are vertical, and preferably the outlet tubing is centered about the vertical axis.

DETAILED DESCRIPTIONS OF THE PREFERRED EMBODIMENTS

Figure 1:
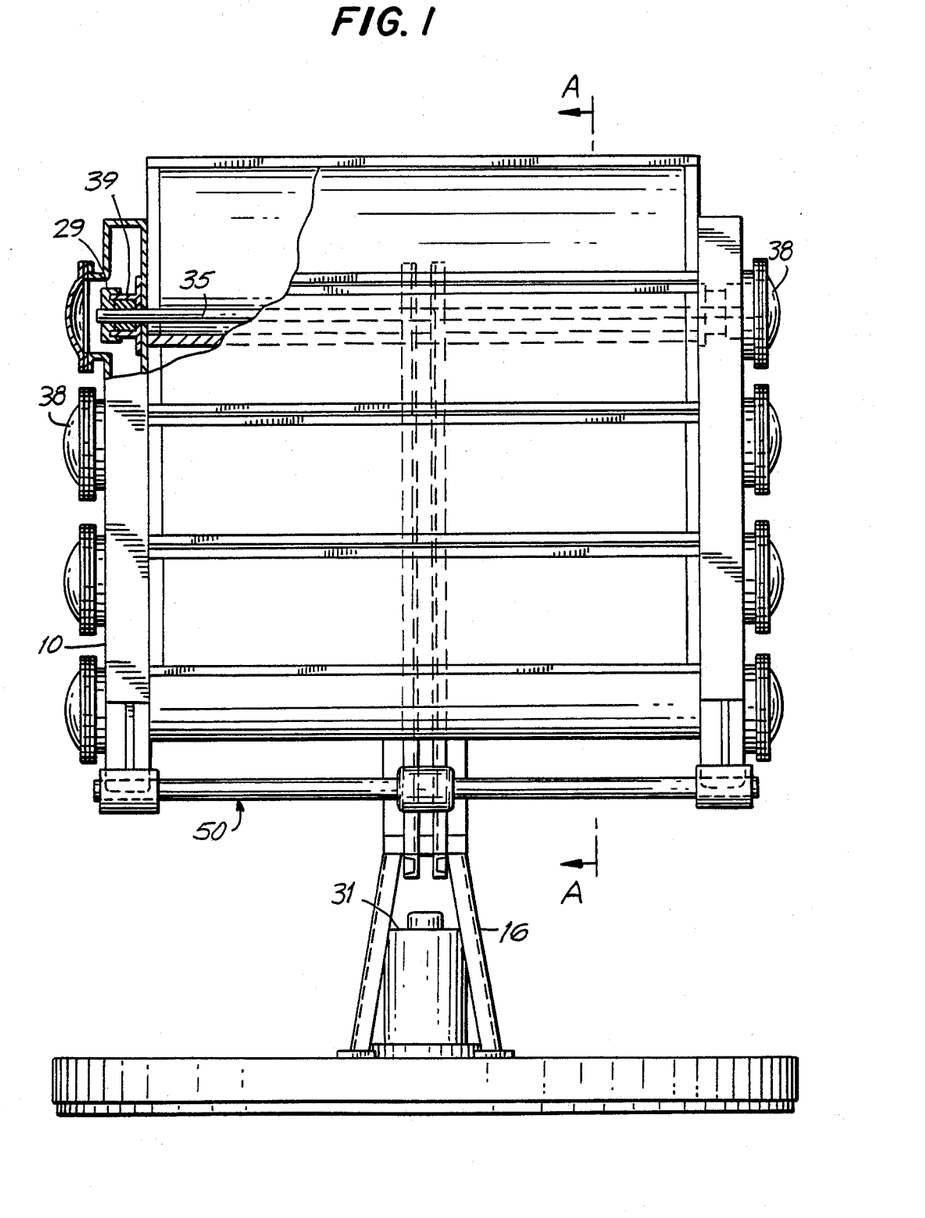
FIG. 1 is a front elevation view of one embodiment of a solar radiation collecting system in accordance with this invention, where the solar panel is at a 45° angle.
Figure 2:
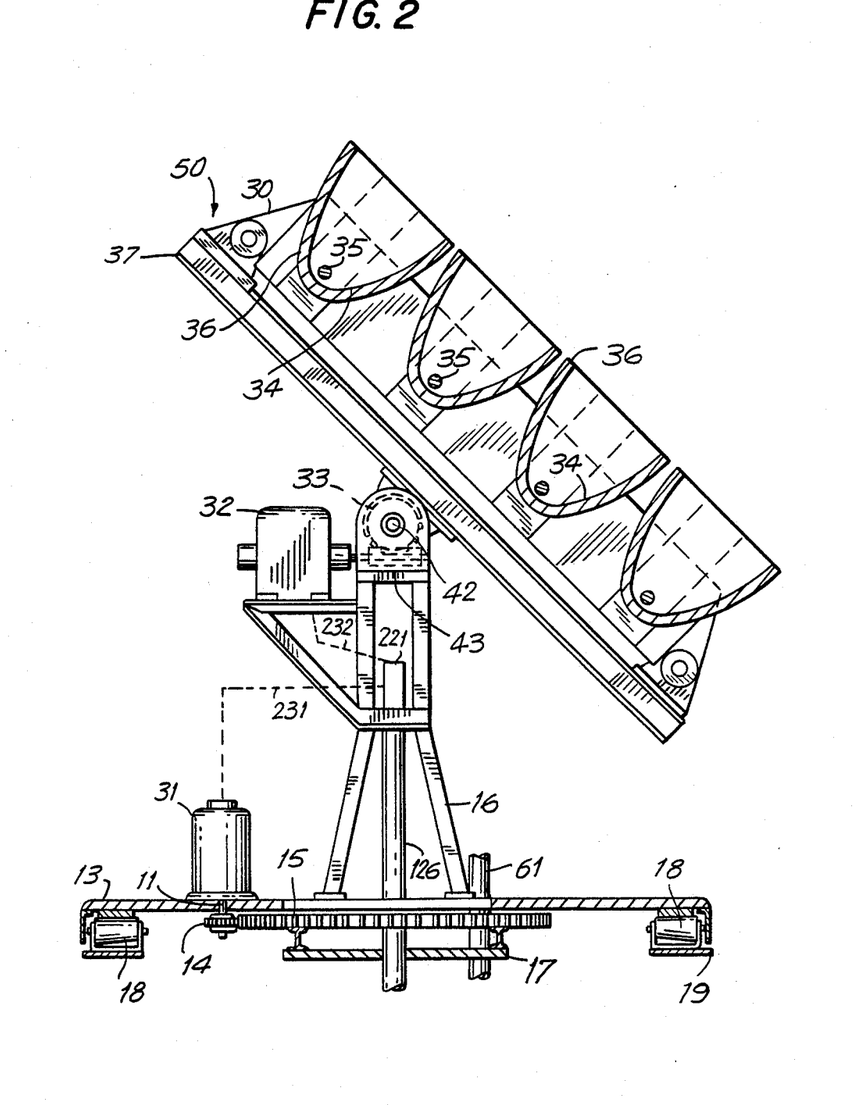
FIG. 2 is a vertical sectional view taken along lines A—A of FIG. 1.

Referring initially to FIGS. 1 and 2 for overall views of the embodiments of the present invention, a four legged stand 16 is supported upon a rotating pedestal ring 13. The pedestal 13 is rotatably supported upon a plurality of tapered roller bearings 18 distributed at equal angular increments around the pedestal 13. The tapered bearings 18 are in turn supported upon and secured to a stationary plate 19 resting upon the ground. Adjacent the stand 16 and also supported upon the rotating pedestal 13, is an electric motor 31 operatively connected through a drive shaft 11 to a thrust driver gear 14. The gear 14 is supported below the rotating pedestal 13 and is drivingly meshed with a larger stationary thrust ring 15 which in turn is secured to the top surface of the stationary plate 17.

Rotatably journaled through an upper portion of the support stand 16 is a horizontal shaft 42 which is secured to a driven worm gear 33. Supported on the worm gear 33 and rotating therewith about the axis of shaft 42 is a solar panel, generally indicated by the numeral 50. The solar panel comprises a frame formed of standard channel beam members 37 upon which is supported a fluid flow system comprising an inlet manifold 10 and an outlet manifold 12 (as shown in FIG. 1) which in turn are in fluid flow connection through a plurality of parallel tubes 35 (as shown in FIG. 2), which are formed of transparent material. Support brackets 30 secure the manifolds 10, 12 and the parallel tubes 35 to the frame members 37.

A bed of insulated material, such as high temperature resistant foam, is formed within the frame members 37 and between the brackets 30. Surrounding the plurality of parallel tubes 35 and embedded within the foam insulating material are a battery of troughs 36, the interior surfaces 34 of which are in the shape of parabolic reflectors. Each of the tubes 35 extend along and are substantially coaxial with the focal line of the parabolic reflector surfaces 34, and most preferably the walls of the tubes 35 do not touch the parabolic reflector surfaces 34.

When using a parabolic reflector, the tubes are relatively small, such that, e.g., a one inch external diameter tube 35 will fit within a parabola 16 inches high and 15 inches wide at the top.

The driven worm gear 33 is operatively driven by a driving worm 43 secured to the drive shaft of electric motor 32 which is secured to the stand 16. Both electric motors 31, 32 in this embodiment are of the synchronous type.

The two electric motors 31, 32 are controlled by a single computer control means 221, programmed for a year-long operation to preset the panel about the two axes and to start the two motors 31, 32 at the proper time each morning (based upon the sunrise time for that day) and to stop the motors at or before sunset for each day. The programmed computer can also reverse the direction of rotation of both motors 31, 32 to return the panel 50 to the starting position for the following day. The computer control means 231 is schematically shown to be electronically connected, by lines 231, 232 to the two electric motors 31, 32.

In FIGS. 1 and 2, the solar panel 50 is shown at approximately a 45° angle to the horizontal.

A leak-proof seal is formed at the junctions of the transparent pipes 35 and each of the manifolds 10, 12 (as shown in FIG. 1) by providing stuffing box seals generally indicated by the numeral 39. Access to the manifolds 10, 12 and the stuffing boxes 39 is obtained by removing hand hole covers 38.

Figure 3:
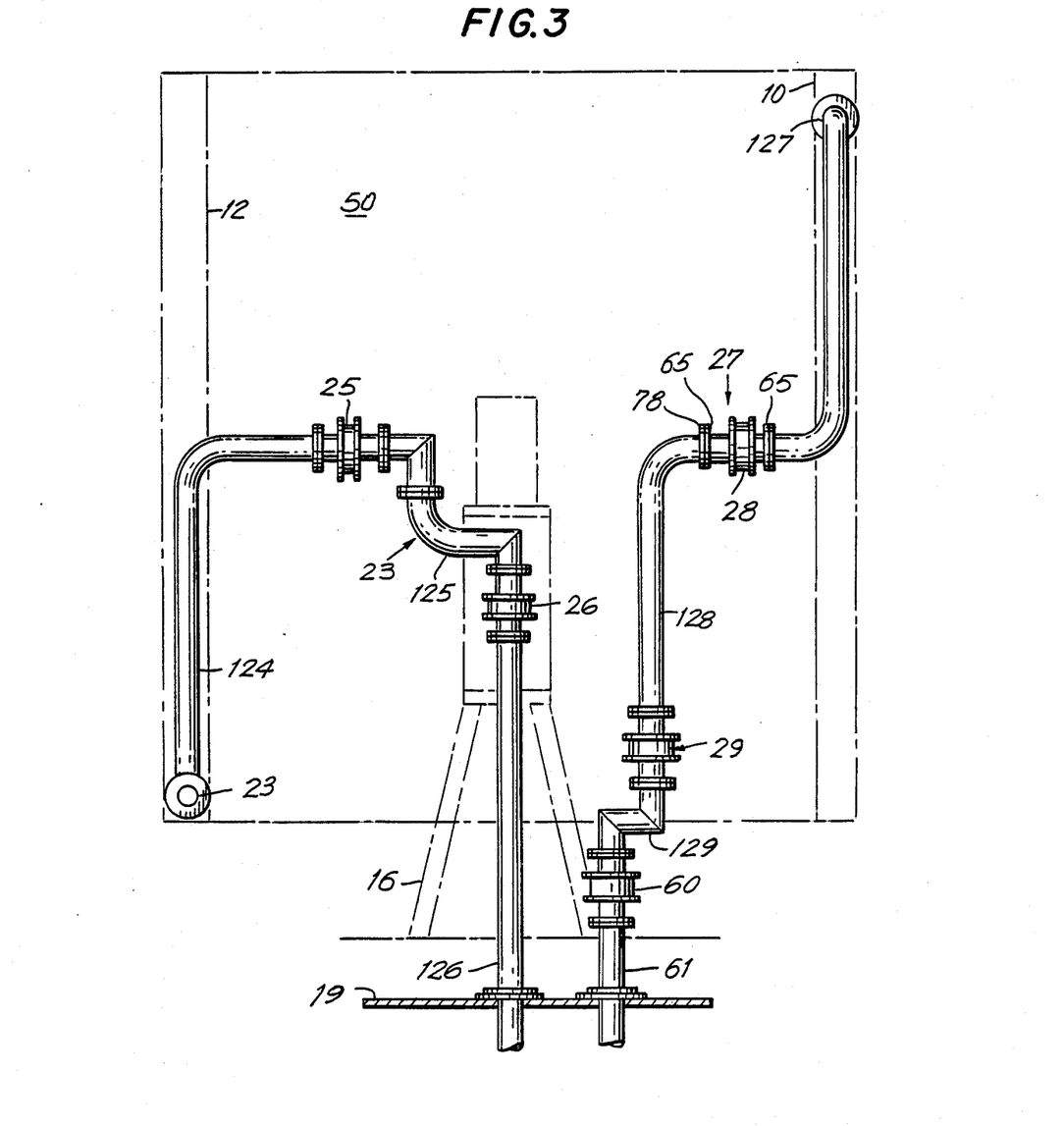
FIG. 3 is a rear elevation view of a portion of the embodiment of FIG. 1, where the solar panel is vertical.
Figure 4:
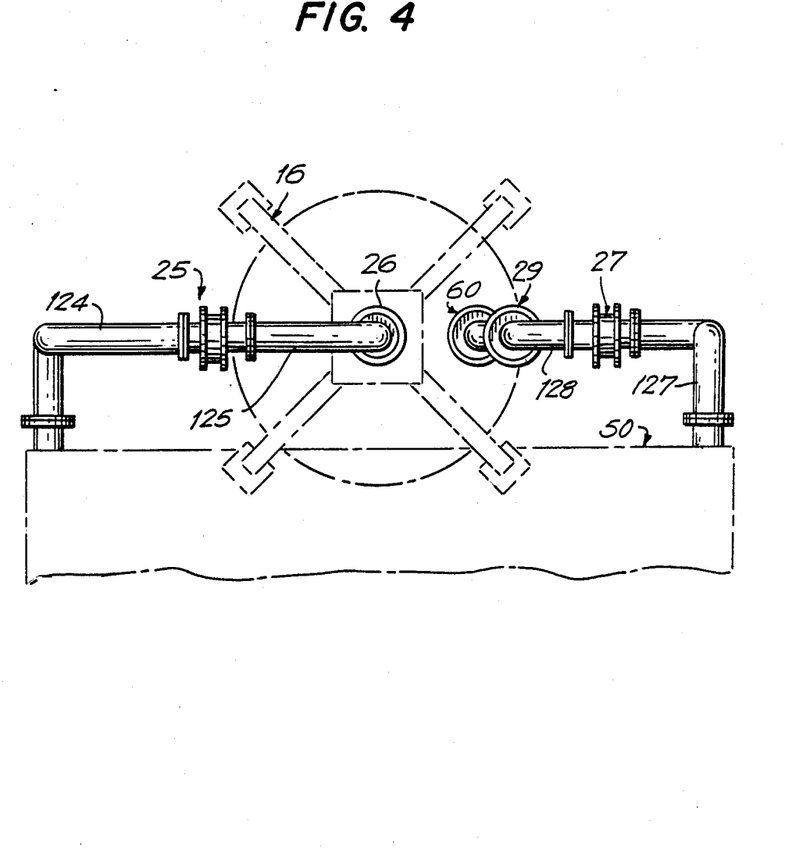
FIG. 4 is a top view of the embodiment of FIG. 1.
Figure 5:
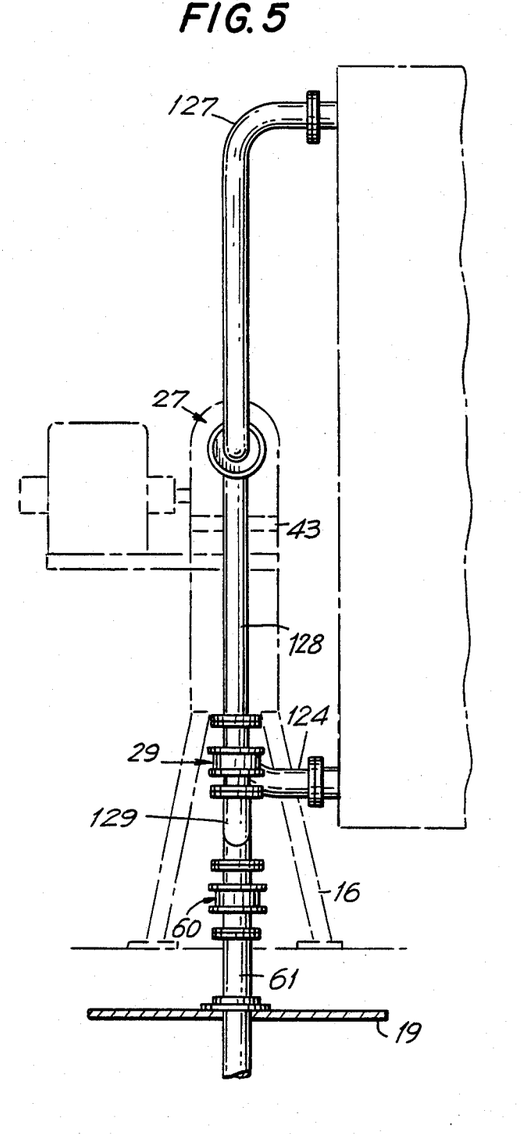
FIG. 5 is a right side view of the embodiment of FIG. 1.
Figure 12:
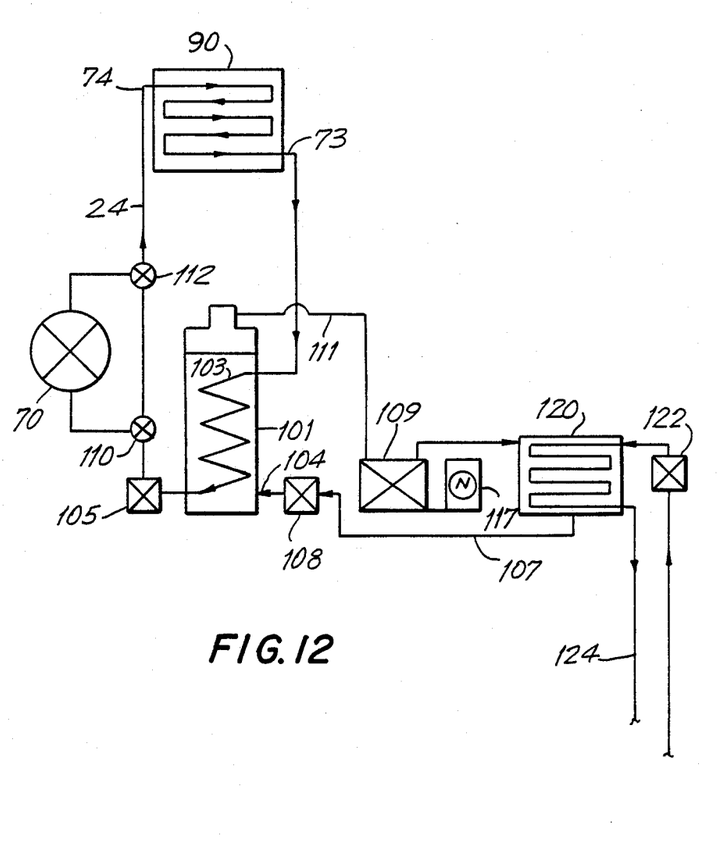
FIG. 12 is a schematic diagram for an electricity generating system utilizing the solar collector of the invention.

The piping arrangement for providing fluid to the inlet manifold 10 and from the outlet manifold 12 is shown in FIGS. 3, 4 and 5. The inlet manifold 10 is connected through the inlet pipes, generally indicated by numeral 27, and the outlet manifold 12 leads to the outlet pipes, generally indicated by numeral 23. Each of the inlet and outlet pipes 27, 23 comprise a series of pipes which must rotate relative to each other and to a stationary final pipe, in order to accommodate the swiveling and rotary movement of the solar panel 50 as it tracks the sun. Thus, the initial lengths 124. 127, respectively, of the inlet and outlet pipes, are fixedly secured to the respective manifolds 10, 12 at one end and are connected through swivel joints 28, 25 to a second length of pipe 128, 125 and then each to a second swivel joint 29, 26. The second outlet swivel joint 26 is then connected to final outlet pipe 126 which is centered on the vertical axis of rotation and is secured to the stationary plate 17, passing therethrough to, e.g., a boiler-heat exchanger (as shown in FIG. 12). The second inlet pipe swivel joint 29 is connected to a further swiveling pipe length 129, which is in turn connected to a third inlet swivel joint 60, which in turn is rotatably connected to a stationary inlet pipe 61, secured to and through the stationary support plate 17.

Thus, in order to accommodate the swiveling and rotating motion of the solar panel 50 and to prevent leakage of the heated fluid, which may be at advanced pressure, depending on, e.g., the fluid temperature or pump pressure, a series of sealed swivel joints have been provided in accordance with the present invention.

Figure 6:
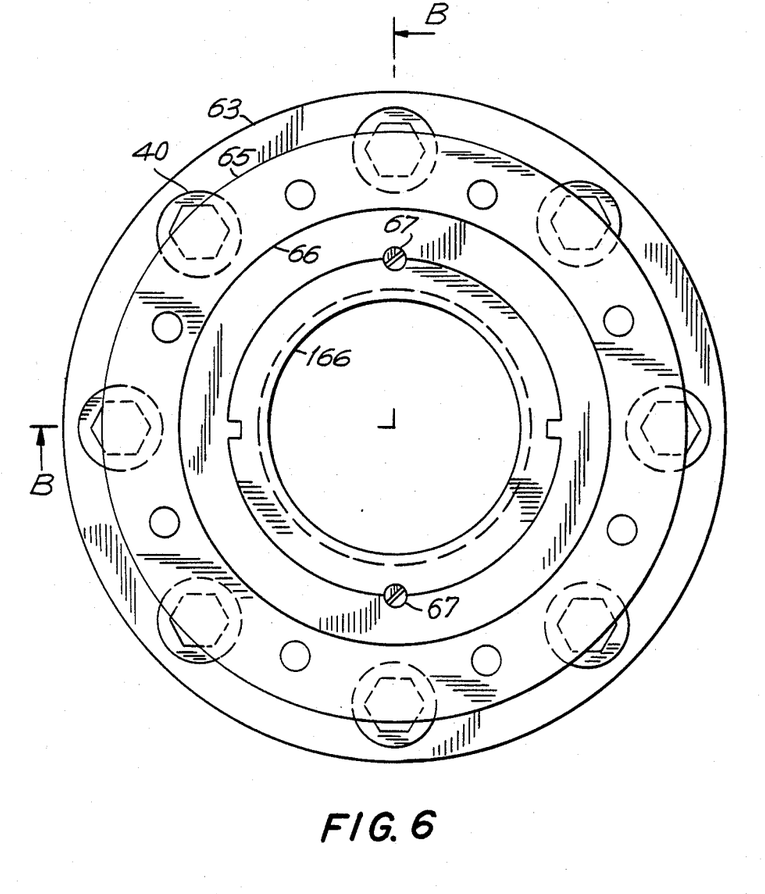
FIG. 6 is an end view in partial cross section of a swivel joint used in the preferred embodiment of this invention.
Figure 7:
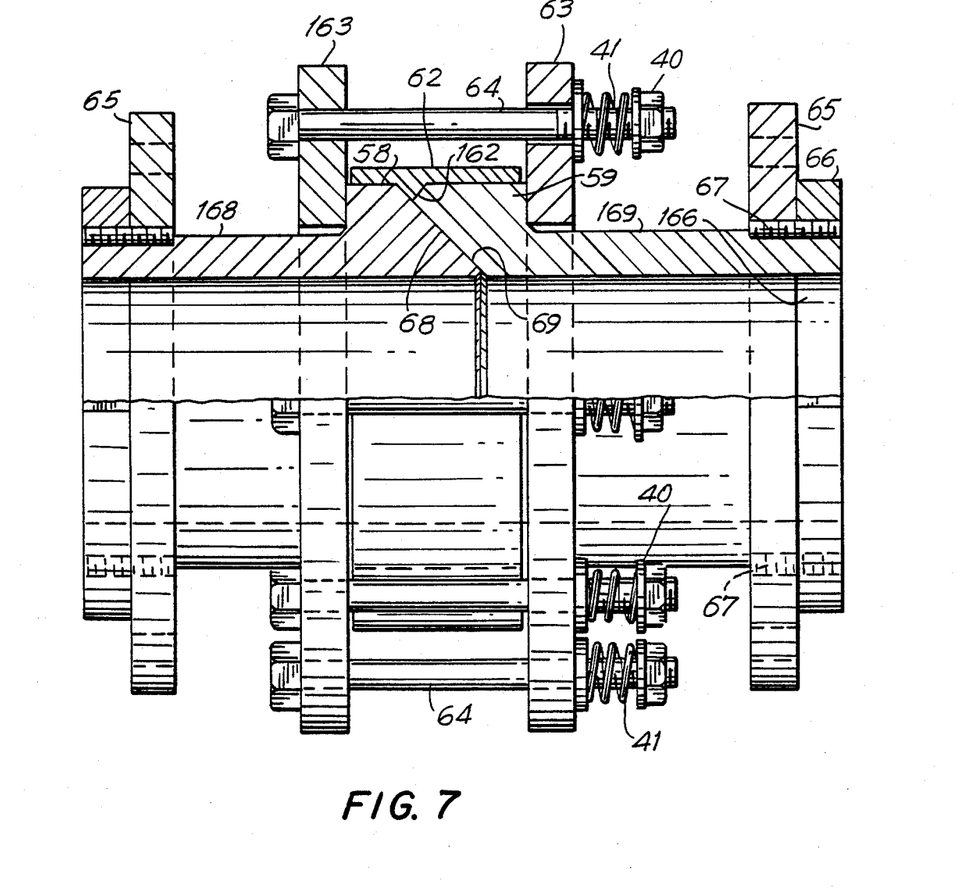
FIG. 7 is a cross-sectional view of the swivel joint of FIG. 6 taken along lines B—B.

The swivel joint is shown in detail in FIGS. 6 and 7 and is so designed that the combination of the several swivel joints 25, 26, 28, 29, 60 shown in the drawings, will permit a full 360° turn with respect to the stationary inlet and outlet pipes 126, 61. Each swivel joint comprises two coaxial, male and female, main body parts 168, 169, which are held together and in full contact along the carefully ground and smooth, case-hardened conical surfaces 68, 69, respectively, which are located at flange portions 58, 59, respectively. Tightly slipped over and around the two flange portions 58, 59 of the body parts 168, 169, at their intersection, is a pressure ring 62 (formed for example of brass, monel or bronze). The ring 62 includes a wedge-shaped protrusion 162 which fits within a complementary depression formed at the interfaces of the two flange members 58, 59. This ring 62 and wedge 162 serve to further prevent leakage past the contacting ground conical surfaces 68, 69; the pressure ring 62 helps to ensure a firm seal while permitting relative rotary motion between body parts 168, 169. The two body parts 168, 169 are clamped together by their flange members, utilizing two loose flanges 63, 163 held together by spring-loaded bolts 64; the bolts 64 are held in place by washer nuts 40, holding the springs 41 in place and under the desired tension.

The outer end of each of the body parts 168, 169 is externally threaded and is in threaded connection with the female threaded end flange 65 and ring nut 66. The end flange 65 is in turn connected to the ring nut 66 by two set screws 67, in a manner to prevent relative rotation between those parts. The ring nut 66 includes a flat gasket face in contact with the adjoining incoming and outgoing pipes, e.g., the adjoining pairs of pipes 127, 128 (as shown in FIG. 3). Each of those pipes 127, 128 includes a matching flange 78 which is bolted to flange 65, thus immovably securing the pipes 127, 128 to the respective body part 168, 16 (FIG. 7) in a fluid-tight fashion. It is preferred that this bolted type of end connection be used between each swivel joint and the adjoining pipes in order to avoid the heat distortion created by welding, which might otherwise warp the matching ground surfaces 68, 69.

Another preferred embodiment of the solar panel, which can be used in place of the solar panel 50 shown in FIGS. 1 and 2, is the solar panel generally indicated by the numeral 90, shown in FIGS. 8 through 11; solar panel 90 is a preferred type to be used in those locations where, at least during a certain period of the year, there are adverse weather conditions, such that the solar radiation is much less than the optimal intensity. In this solar panel 90, there is also provided a battery of collector units, each generally indicated by the numerals 81, 113, 114, 115, 116, 84, respectively, supported by a solar battery frame 75, which in turn is rotatably supported on the first rotating horizontal axis as is shown in FIGS. 1 and 2. Each of the individual solar collectors 81, 113, 114, 115, 116, 84 includes a length of transparent pipe 76a, b, c, d, e, f, extending along its longitudinal axis. In this embodiment, the lengths of pipe 76a-f in all of the converters on the solar panel 90 are linked together in series.

Thus, in this embodiment, the inlet 74 is in series connection with the outlet 73. As in the embodiment of FIGS. 1, 2, each of the individual lengths of pipe 76 extend coincident with the focal line of its respective solar collector. Each solar collector 81, 113, 114, 115, 84 comprises a trough or box-like member formed by side walls 88, the interior surfaces of which need not be reflective, and a concave end portion 80, the interior concave surface of which is a reflective concave linear mirror 180 with a linear focus, which should be substantially coincident with the center-line of the pipe 76. The concave end portion 80 is slidably secured to the side walls 88, so as to be movable towards and away from the pipe 76, so as to enable the operator to focus the reflector on the centerline of the pipe 76. The open outer end portion of the trough, facing the sun, is covered with a linear convex lens 83 having a linear focus also coincident with the center line of the pipes 76a-f. The pipe 76 or the lens should also be slidable relative to the side walls and to each other, to provide for focusing the lens on the pipe centerline. As shown in the cross-section of FIG. 11, the lens 83 can slide relative to, and between, the two side walls 82 of the trough, towards and away from the pipe 76 and the concave reflector surface 180. Again, the pipes 76a-f are preferably transparent, such that the sunlight is focused on the fluid at the axis of the pipes 76, rather than on the pipe surface.

Figure 8:
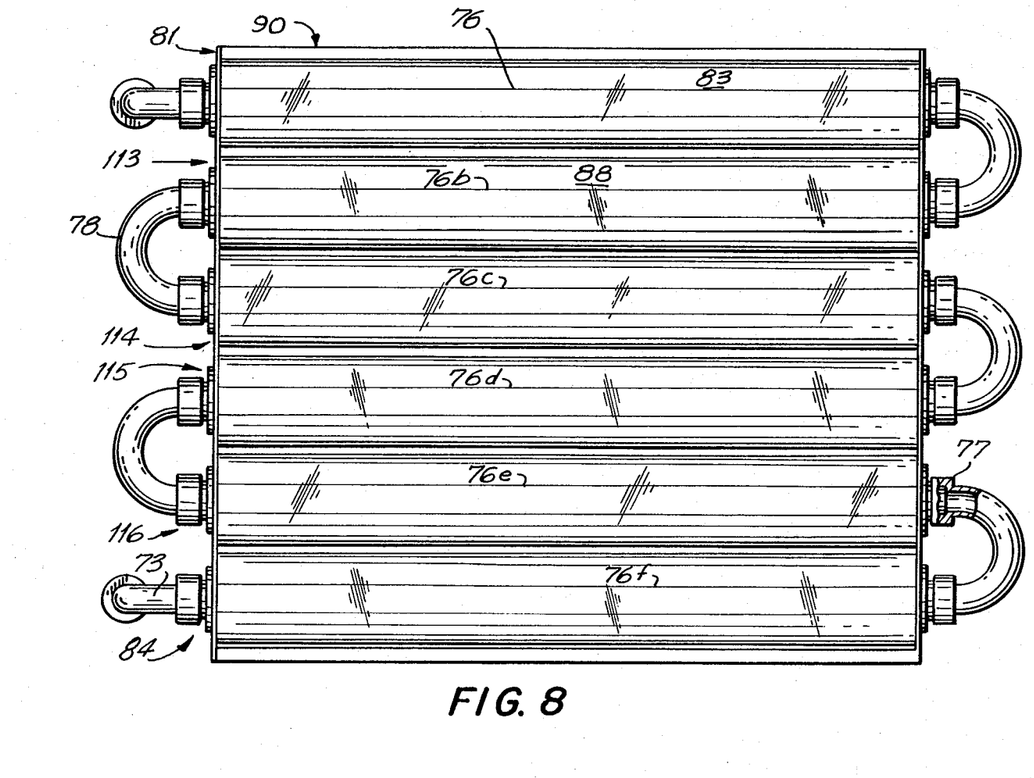
FIG. 8 is a plan view of a second embodiment of a solar panel used in the solar collection apparatus of the present invention.

The plurality of pipes 76a, b, c, d, e, f are interconnected via elbow joints 78, located outside of, and in intermediate fluid-flow connection between the pipes 76 within, the battery of solar collector troughs 81, 113, 114, 115, 116, 84. The elbow joints pipes are preferably opaque, as they are not exposed to the focused sunlight and can be insulated. Each elbow joint 78 is connected to the adjacent focal line pipes 76 via a flanged stuffing box 77; for ease of connection, a stuffing box gland is welded to each end of the elbows for connecting through the stuffing box to the ends of the focal line pipes 76.

A lens member 83 is secured along the outwardly facing end of the collector units 81, 113, 114, 115, 116, 84.

The glass or other transparent refractory medium of the lens 83, is secured to the sides of the solar collector trough 88 utilizing for example a U-shaped rubber gasket 56 along the edges of the glass and contacting the trough sidewalls 88. The gasket and lens can be secured to the sidewalls 88 by, for example, a series of Z-shaped clips 82 which clamp the lens 83 onto the sidewalls 88. Thus, securing the lens 83 along the entire top length of each reflecting collector 81, 113, 114, 115, 116, 84, prevents foreign objects or dirt from falling into the collector and marring the reflecting surfaces or covering the pipes.

Figure 10:
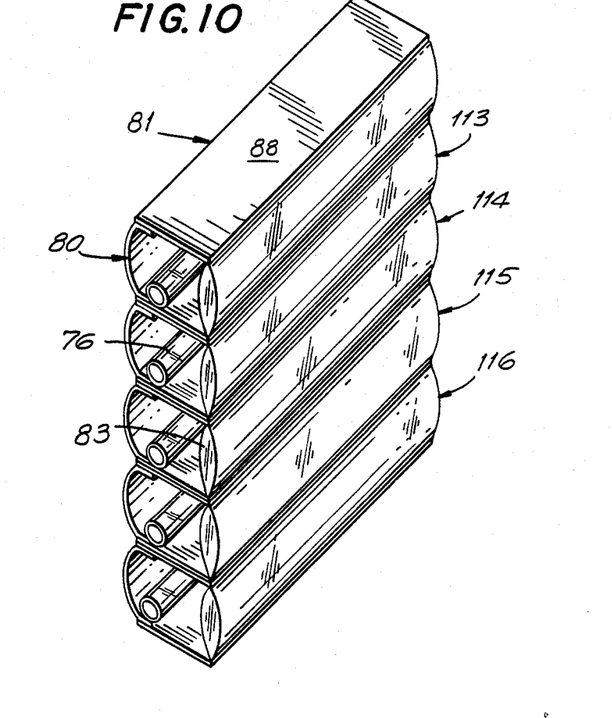
FIG. 10 is an isometric view of a battery of focusing elements for the solar panel of FIG. 8.
Figure 11:
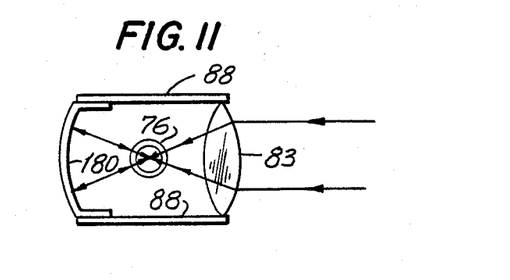
FIG. 11 is a cross-sectional view of one focusing element of the embodiment of FIG. 8 with a ray diagram.

As this embodiment of FIGS. 10-12 is specifically directed for use in those regions having substantial periods when incident sunlight is far less then the optimum brightness, provision is made to prevent overheating when the system is exposed to periods of direct sunlight, especially when the ambient temperature is high, as during summer months in temperate regions. To avoid overheating under such conditions, it is preferred to operate at a temperature far below the boiling point of the primary liquid. For example when using glycerine as the primary fluid, the maximum operating temperature should not be above about 300° F. To limit excessive temperature increase, this system is provided with a series of shutter-like devices 57, which can be individually activated based upon the temperature within the focal pipes 76.

Figure 9:
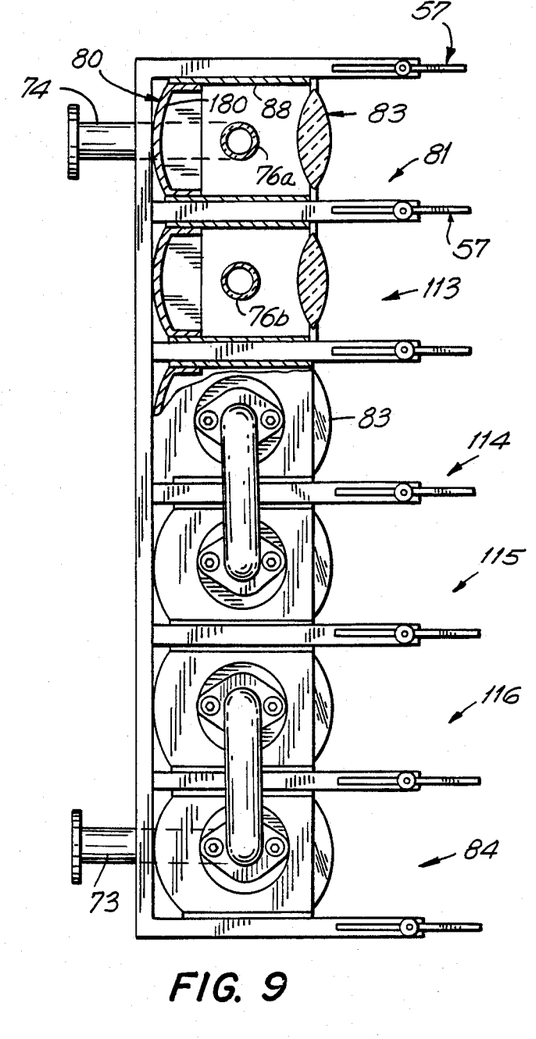
FIG. 9 is a side view, in partial cross-section, of the embodiment of FIG. 8.

For example, a thermostat in the outlet 73 can be set successively to actuate means to close the shutters 57 at a predetermined high temperature level for one or more of the collector units 81, 113, 114, 115, 116, 84, and continue to close off additional shutters 57 until the temperature stabilizes at below the predetermined temperature. As shown in FIG. 9, the shutters 57 are all in the open position. When in the closed position, incident sunlight does not penetrate to the focusing lens 83, and thus does not enter the collector to heat the operating fluid in the focal line pipes 76. The particular shutter closing mechanism is not a part of this invention and any known system can be utilized to rotate the shutter, as shown, into the closed position. In addition, other than rotating shutters, sliding shutters could also be utilized to close off the collector units 81, 113, 114, 115, 116, 84.

The focusing lens member 83 is shown as a conventional double convex configuration. The particular type or shape of lens is not crucial as long as all of the incident sunlight can be focused on a focal line coincident with the longitudinal axis of the pipe 76. Other types of lens include, for example, Fresnel lens, or a lens formed of a plurality of integral prismatic segments, each segment acting as a prism to deflect the sunlight entering through the lens in a manner similar to that of a standard convex lens. Any other refracting focusing means providing the same concentration of incident sunlight over the entire surface of the lens focused on to the center portion of the focal line pipe could be substituted for the linear convex lens 83.

As an aid to focusing the convex lens 83 and concave reflector 180 on the center line of the transparent tube 76, a light-reflective wire can be strung along the central axis of each tube; the collector unit can be exposed to sunlight or other parallel light source, and the location of the concave reflector 80 and tube 76 or lens 83 adjusted by conventional calibrating means until the focal lines converge on the reflector wire.

The operation of the solar collector 90 including a refracting lens 83 is shown by the ray diagram of FIG. 11; incident light passing through the lens 83 is focused on the longitudinal axis of the pipe, and any light which passes through or around the pipes 76, in the collectors 81, 113, 114, 115, 116, 84, is then reflected back from the concave end reflector 80 to the center line of the pipe 76. If desired, the inner surface 173 of the lens 73 can be made reflective to radiation from within the collector 90. As designed, and as shown in FIG. 11, light is continuously reflected back and forth within the system, but is always focused on the center-lines of the pipes 76.

Preferably, the primary fluid is circulated at a rate of flow sufficient to improve heat transfer by flow turbulence and to prevent the excessive heating of the fluid in the tubes. This results in greater efficiency in the intake of heat from solar radiation and lower heat transfer losses. As a further protective mechanism, it is useful to increase flow through the tubes responsive to higher temperature, e.g., when sunlight is not reduced by clouds.

As pointed out, the solar collection system of the present invention is especially useful as part of a system for generating electricity.

The system utilizes solar energy to boil an operating fluid to drive an electric generator. One system for utilizing the solar collecting system of the present invention is shown in FIG. 12. The example shown utilizes the series type solar panel 90 of FIG. 8 through 11, but the parallel flow-type of collector 50, of FIGS. 1 and 2 can also be used, or combinations of the two types.

The inlet and outlet flanges 73, 74 are connected to a piping system at the reverse side of the panel 90 similar to that shown in FIGS. 3, 4 and 5. As in that earlier embodiment, swivel joints are provided to permit the biaxial rotating movement necessary for tracking the sun.

In the energy system of FIG. 12, a solar panel 90, through which a high boiling point primary operating fluid, such as glycerin, or Dowtherm, is being recirculated, heats the fluid and passes it outwardly through exit pipe 21 to a boiler-heat exchanger 101. The primary liquid passes through tubes 103, counter-currently to a secondary liquid in the shell. Exiting the boiler heater exchanger 101, the primary liquid is moved through recirculation pump 105 and then returned via line 24 to the inlet to the solar panel 90. Three-way bypass valves 110, 112 permit bypassing the primary fluid to an evaporative cooler 70 in the event of potential overheating of the system due to excessively bright sunlight and high ambient temperatures.

The secondary fluid system comprises a boiler feed pump 108 which feeds the secondary liquid, i.e., a relatively low boiling liquid such as, for example, ammonia-water solution, to the shell side of the boiler heat exchanger 101 through a condensate return line 104. The secondary fluid is permitted to evaporate within the boiler-heat exchanger 101 and then passes outwardly from the top through the vapor line 111 to a steam turbine 109 which is driven by the relatively high pressure vapor from the boiler 101. The turbine 109 is operatively coupled to an electric generator 117. The low pressure exhaust from the turbine 109 is then passed to the shell side of a surface condenser 120, where it is condensed and cooled by cold water, e.g., from an external source. The condensate from condenser 120 is then returned through line 107 to the boiler-feed pump 108 and again fed to the boiler 101. The condenser cooling water is fed via the cold water pump 122 and then returns to the water source by a return line 124.

The piping, as well as the shell of the boiler 101 and other units, should be insulated to prevent heat loss from the secondary fluid.

It is well known that the boiler pressure from an ammonia-water solution at a given range of temperature can be raised by changing the proportion of ammonia. For example, published tables show that a pressure of 200 psi is achieved at 222.5° F. from a solution of 34% by wt. ammonia in water, and a pressure of 182 psi, at 223° F. from a solution of 32% by wt. ammonia to water.

The two embodiments herein-described, i.e., reflective alone and reflective-refractive systems, can be combined for use in different seasons of the year.

Suitable materials for forming the transparent focal line pipes in the solar panels of this invention, especially the preferred transparent pipes, include shock and temperature-resistant glass, quartz, polycarbonates, or other similarly temperature-resistant polymeric materials.

WORKING EXAMPLE

When utilizing the solar energy converters of the present invention at a site located in New York City, on Sept. 21, at latitude 41°, the solar panel should begin operating at sunrise vertically disposed and facing due east. The synchronous electric motors 31 are so operated that the solar panel rotates about its horizontal axis at an at an angular velocity of 15°/hour, and rotates about its vertical axis at an annular velocity of 15°/hour.

A preferred reflector-refractor system, of FIGS. 8–10, includes polycarbonate tubes of 1.5 in. outside diameter in troughs 10 ins. wide and up to 16 ins. deep.

This system is extremely simple in design and, operating at relatively low temperatures, avoids the use of expensive materials of construction. The operation of this system can be fully automated. One advantage being that even a serious malfunction of the automatic operating system is not likely to have catastrophic consequences.

The patentable embodiments which are claimed are as follows:

1. A solar heat collecting apparatus comprising a solar collector panel; rotatable support means for rotatably supporting the solar panel about a horizontal axis and a vertical axis; and drive means for rotating the panel about the two axes; the collector panel comprising a battery of individual collector units, each collector unit comprising an elongated trough member, a concave reflective surface forming at least a portion of the interior surface of the trough, and a fluid-carrying pipe extending longitudinally within the trough member, the longitudinal axis of the pipe being substantially coincident with the focal line of the concave reflector surface, the fluid-carrying pipe being formed of material that is substantially transparent to solar radiation; and a linear focusing lens substantially covering and extending over the concave reflective surface, the focal line for the linear lens being substantially coincident with the longitudinal axis of the fluid-carrying pipe.

2. A solar heat collecting apparatus for providing solar radiation amplification by the interaction of reflection and refraction, the apparatus comprising:
  (1) a solar collector panel having an operating surface which comprises a battery of individual collector units, the collector units each comprising an elongated trough member, a concave reflective surface forming at least a portion of the interior surface of the trough, a linear focusing lens substantially covering and extending over the concave reflective surface, and a fluid-carrying pipe extending longitudinally within the trough member, and the pipe being formed with walls that are substantially transparent to the solar radiation; the longitudinal axis of the pipe being substantially coincident with the focal line of the concave reflector surface and of the linear lens;
  (2) rotatable support means for rotatably supporting the solar panel about a horizontal axis and a vertical axis;
  (3) drive means for rotating the panel about the two axes;
  (4) movement limiting control means comprising first limiting means for limiting movement of the panel about the horizontal axis to less than 180°, such that the interior surface of each trough continuously faces skyward; second limiting means for limiting movement of the panel about the vertical axis to less than 270°;

(5) constant speed motor means for continuously rotatably moving the panel about the two axes when the motor is activated; and (6) programmable control means to set the initial angular position of the panel about the axes each day, and to activate the motor means at a predetermined time of day, such that the resultant movement of the panel about the two axes maintains the operating surface in positions substantially perpendicular to solar radiation during the entire daylight period.

3. The solar collecting apparatus of claim 2, wherein the concave reflective surface is substantially a parabolic reflector.

4. The solar Collecting apparatus of claim 2, wherein the linear lens is sealingly secured to the trough means.

5. The solar collecting apparatus of claim 2, comprising at least two collector units, the pipes in the troughs being in series fluid flow relationship.

6. The solar collecting apparatus of claim 2, comprising adjustable means to permit relative movement between the linear lens and the reflector surface of the trough and the pipe, to provide for the coincidence of the focal lines of the lens and of the reflector with the centerline of the pipe.

7. The solar collecting apparatus of claim 6, comprising adjustable means for securing the linear lens to the trough member such that the lens is movable towards and away from the reflector surface to provide for the coincidence of the focal lines of the lens and of the reflector with the center line of the pipe.

8. A solar collector panel comprising at least one collector unit, the collector unit comprising an elongated trough member, a concave reflective surface forming at least a portion of the interior surface of the trough, a fluid-carrying pipe extending longitudinally within the trough member and being formed with walls that are substantially transparent to solar radiation, and fluid within the pipe, the fluid being capable of transmitting solar radiation to the longitudinal axis of the pipe, the longitudinal axis of the pipe being substantially coincident with the focal line of the concave reflector surface.

9. The solar collector panel of claim 8 further comprising adjustable means to permit relative longitudinal movement between the trough member and the pipe such that the trough member is movable towards and away from the pipe to provide for the coincidence of the focal lines of the reflector and the centerline of the pipe.

10. The solar collecting apparatus of claim 8 further comprising a linear focusing lens substantially covering and extending over the concave reflective surface so as to form a closed unit surrounding the pipe defined by the lens and the reflective surface.

11. The solar collecting apparatus of claim 10 comprising adjustable means to permit relative movement between the linear lens, the pipe and the trough member, such that at least one of the lens and the reflector is movable towards and away from the pipe to provide for the coincidence of the focal lines of the lens and of the reflector with the centerline of the pipe.

12. The solar collecting panel of claim 8 comprising a closed fluid flow circuit in fluid flow connection with the pipe, and a fluid flowing within the circuit and through the pipe.

13. The solar collecting panel of claim 12 wherein the fluid is glycerin.

14. The solar collecting panel of claim 12 comprising a plurality of collector units.

15. The solar collecting panel of claim 14 wherein the pipes in the collector units are in series fluid flow relationship.

16. The solar collecting panel of claim 14 comprising an inlet manifold and an outlet manifold each in fluid flow connection with each of the pipes, the pipes being thus in parallel fluid flow relationship between the manifolds.

17. A solar collector panel comprising at least one collector unit, the collector unit comprising an elongated trough member, a concave reflective surface forming at least a portion of the interior surface of the trough, a fluid carrying pipe extending longitudinally within the trough member and being formed with walls that are substantially transparent to solar radiation, the longitudinal axis of the pipe being substantially coincident with the focal line of the concave reflector surface, and adjustable means to permit relative movement between the trough member and the pipe transverse to the longitudinal axes, such that the trough member is movable towards and away from the pipe to provide for the coincidence of the focal lines of the reflector and the center line of the pipe.

* * * * *